(12) United States Patent
Boday et al.

(10) Patent No.: US 9,039,486 B2
(45) Date of Patent: May 26, 2015

(54) TEXTURING OF A STORAGE CELL FOR REDUCED FRICTION RETENTION OF A DATA STORAGE CARTRIDGE

(75) Inventors: Dylan J. Boday, Tucson, AZ (US);
Andrew S. Green, Tucson, AZ (US);
Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/606,812

(22) Filed: Sep. 7, 2012

(65) Prior Publication Data

US 2014/0069250 A1 Mar. 13, 2014

(51) Int. Cl.
| | |
|---|---|
| B24B 1/00 | (2006.01) |
| B24D 99/00 | (2010.01) |
| G11B 23/04 | (2006.01) |
| G11B 15/68 | (2006.01) |

(52) U.S. Cl.
CPC .............. *B24D 99/00* (2013.01); *G11B 23/049* (2013.01); *G11B 15/68* (2013.01)

(58) Field of Classification Search
CPC ........ B24D 15/02; B24D 15/08; B24D 15/00; B24D 15/04
USPC ........ 451/540, 557, 558, 28; 15/101, 104, 94, 15/210
See application file for complete search history.

(56) References Cited

U.S. PATENT DOCUMENTS

| | | | | |
|---|---|---|---|---|
| 1,534,259 A | * | 4/1925 | Dempsey | 401/130 |
| 1,570,177 A | * | 1/1926 | Pointer | 451/495 |
| 1,931,498 A | * | 10/1933 | Kattrein | 29/76.1 |
| 2,469,586 A | * | 5/1949 | Wallace | 451/507 |
| 2,816,351 A | * | 12/1957 | Sauers | 407/29.1 |
| 3,141,270 A | * | 7/1964 | Ferrand | 451/557 |
| RE26,039 E | * | 6/1966 | Johnson | 451/524 |
| 4,263,692 A | * | 4/1981 | Gremillion | 15/210.1 |
| 4,333,214 A | * | 6/1982 | Neumann et al. | 407/29.1 |
| 4,845,901 A | * | 7/1989 | Hamlin | 451/523 |
| 4,951,425 A | * | 8/1990 | Naghi | 451/558 |
| 4,993,100 A | * | 2/1991 | Halboth et al. | 15/118 |
| 5,025,526 A | * | 6/1991 | Ichitsubo et al. | 15/210.1 |
| 5,058,327 A | * | 10/1991 | Buchanan | 451/462 |
| 5,177,906 A | * | 1/1993 | Balding et al. | 451/558 |
| 5,241,793 A | * | 9/1993 | Armato | 451/558 |
| 5,483,419 A | | 1/1996 | Kaczeus, Sr. et al. | |

(Continued)

OTHER PUBLICATIONS

D.J. Boday, A.S. Green, S.M. Nave; 'Reduced Friction Retention of a Data Storage Cartridge Within a Storage Cell'; IBM Corporation; pp. 1-26 (includes 7 Pages. of Figures), U.S. Appl. No. 13/606,666, filed Sep. 7, 2012.

(Continued)

*Primary Examiner* — George Nguyen
(74) *Attorney, Agent, or Firm* — Zilka-Kotab, PC

(57) ABSTRACT

Described are embodiments of an invention for a method and a tool to produce a textured surface on the retention tab of a storage cell. The tool has a form that fits within the storage cell. The form has a hard material with a hard surface with contacts a surface of the retention tab within the storage cell. The movement of the hard surface across the surface of the retention tab produces a textured surface on the retention tab. The textured interface between a notch of a data storage cartridge and a retention tab of a storage cell provides a consistent and low friction force that retains the data storage cartridge within the cell but allows the accessor to easily remove the data storage cartridge when needed.

19 Claims, 8 Drawing Sheets

(56) References Cited

U.S. PATENT DOCUMENTS

| | | | |
|---|---|---|---|
| 5,926,341 | A | 7/1999 | Mueller et al. |
| 6,017,267 | A * | 1/2000 | Ariza et al. .................. 451/523 |
| 6,187,106 | B1 * | 2/2001 | Backlund et al. ............... 134/21 |
| 6,252,765 | B1 | 6/2001 | Balzaretti et al. |
| 6,381,130 | B1 | 4/2002 | Yen |
| 6,381,148 | B1 | 4/2002 | Daskalakis et al. |
| 6,385,040 | B2 | 5/2002 | Nabetani et al. |
| 6,456,501 | B1 | 9/2002 | Rubenstein et al. |
| 6,483,107 | B1 | 11/2002 | Rabinovitz et al. |
| 6,631,863 | B2 | 10/2003 | Nawa |
| 6,661,747 | B2 | 12/2003 | Mueller et al. |
| 6,683,785 | B1 | 1/2004 | Chen |
| 6,819,525 | B2 | 11/2004 | Brace et al. |
| 6,912,132 | B2 | 6/2005 | Riddiford et al. |
| 7,322,841 | B1 | 1/2008 | Chuang |
| 7,417,866 | B1 | 8/2008 | Beseth et al. |
| 7,580,220 | B1 | 8/2009 | Grow et al. |
| 7,843,663 | B2 | 11/2010 | Nave et al. |
| 8,081,488 | B2 | 12/2011 | Kondo et al. |
| 8,462,495 | B1 | 6/2013 | Keefe et al. |
| 8,508,930 | B2 | 8/2013 | Peng et al. |
| 8,636,432 | B2 * | 1/2014 | Kosuge .......................... 400/621 |
| 2002/0006030 | A1 | 1/2002 | Evanson et al. |
| 2002/0056778 | A1 | 5/2002 | Nawa |
| 2003/0128527 | A1 | 7/2003 | Chewning |
| 2004/0074082 | A1 | 4/2004 | Kim et al. |
| 2005/0117288 | A1 | 6/2005 | Spychalla |
| 2005/0221742 | A1 * | 10/2005 | Su .................................. 451/555 |
| 2007/0162915 | A1 | 7/2007 | Hong et al. |
| 2007/0211422 | A1 | 9/2007 | Liu et al. |
| 2007/0230107 | A1 | 10/2007 | Hsu et al. |
| 2008/0089022 | A1 | 4/2008 | Cheung et al. |
| 2008/0231988 | A1 | 9/2008 | Nave et al. |
| 2010/0053880 | A1 | 3/2010 | Jesionowski et al. |
| 2010/0218203 | A1 | 8/2010 | Kusumi |
| 2010/0246109 | A1 | 9/2010 | Matsubara |
| 2011/0090639 | A1 | 4/2011 | Li |
| 2011/0119691 | A1 | 5/2011 | Goto et al. |
| 2011/0132851 | A1 | 6/2011 | Christie, Jr. |
| 2011/0188195 | A1 | 8/2011 | Scherf-Smith et al. |
| 2014/0071609 | A1 | 3/2014 | Boday et al. |

OTHER PUBLICATIONS

Election/Restriction Requirement from U.S. Appl. No. 13/606,666, dated Apr. 8, 2014.

Non-Final Office Action from U.S. Appl. No. 13/606,666, dated Jul. 17, 2014.

Non-Final Office Action from U.S. Appl. No. 13/606,666, dated Dec. 10, 2014.

* cited by examiner

TEXTURING OF A STORAGE CELL FOR REDUCED FRICTION RETENTION OF A DATA STORAGE CARTRIDGE

TECHNICAL FIELD

This disclosure relates to a tool and a method for texturing a storage cell for retention of data storage cartridges within a storage cell.

BACKGROUND

Automated data storage libraries are known for providing cost effective storage and retrieval of large quantities of data. The data in automated data storage libraries is stored on data storage media that are, in turn, stored on storage cells or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash®, Smartmedia®, Memory Stick®, etc.), or other suitable media. Typically, the data stored in automated data storage libraries is resident on data storage media that is contained within a cartridge and referred to as a data storage cartridge. An example of a data storage cartridge that is widely employed in automated data storage libraries for mass data storage is a magnetic tape cartridge.

SUMMARY OF THE INVENTION

Described are embodiments of an invention for a method and a tool to produce a textured surface on the retention tab of a storage cell. The tool has a form that fits within the storage cell. The form has a hard material with a hard surface which contacts a surface of the retention tab within the storage cell. The movement of the hard surface across the surface of the retention tab produces a textured surface on the retention tab. In one embodiment, the removal of the texturing tool from the storage cell causes the hard surface of the texturing tool that is in contact with the at least one surface of the retention tab to scrape the surface of the retention tab causing a textured surface of the retention tab to be produced.

The textured surface of the retention tab reduces the contact surface between the retention tab and a notch of the data storage cartridge which is customarily stored within the storage cell. Accordingly, the reduced contact surface between the retention tab and notch reduces the amount of friction between the retention tab and the notch of the data storage cartridge. The data storage cartridge can thus be removed from the storage cell with less force than that required by the prior art which has a generally smooth interface between the notch of the data storage cartridge and the retention tab of the storage cell. Further, the textured surface allows for a more consistent amount of friction between the notch of the data storage cartridge and retention tab for each data storage cartridge and its respective storage cell such that a consistent amount of force can be applied by the accessor to remove each data storage cartridge from their respective storage cells.

For example, one embodiment includes a tool for texturing. The tool for texturing includes a form that fits within a storage cell. The form includes a hard material which has at least one hard surface. The hard surface of the form contacts a surface of a retention tab within the storage cell when the form is inserted within the storage cell. The movement of the hard surface across the surface of the retention tab produces a textured surface on the surface of the retention tab.

In one embodiment, the hard material is a material that is harder than the material of the surface of the retention tab. In one embodiment, the hard material has a higher hardness than the hardness of the material of the surface of the retention tab. Further, in one embodiment, the hard material may be steel, an abrasive filler, or an abrasive oxide. Still further, in one embodiment, the hard material may be affixed to the form by molding, welding, ultrasonic welding, over molding, compression, adhesive, or by a fastener.

The form of the texturing tool, in one embodiment, has a form factor of a data storage cartridge that is stored within the storage cell. In one embodiment, the form includes a top, bottom, front, back and two sides and at least one side of the form includes the hard surface. The at least one side of the form includes a notch and the hard surface is adjacent the notch. In one embodiment the tool further includes a handle.

Finally, in one embodiment, a method of texturing a storage cell includes inserting and removing a texturing tool into a storage cell. The texturing tool has a hard material having at least one hard surface. The method further includes contacting the surface of the retention tab of the storage cell with the at least one hard surface of the texturing tool. Still further, the method includes removing the texturing tool from the storage cell. The removal of texturing tool causes the at least one hard surface in contact with the retention tab to produce a textured surface on the surface of the retention tab.

BRIEF DESCRIPTION OF THE DRAWINGS

Embodiments of the present invention are understood by referring to the figures in the attached drawings, as provided below.

DETAILED DESCRIPTION OF THE PREFERRED EMBODIMENT

Figure 1:
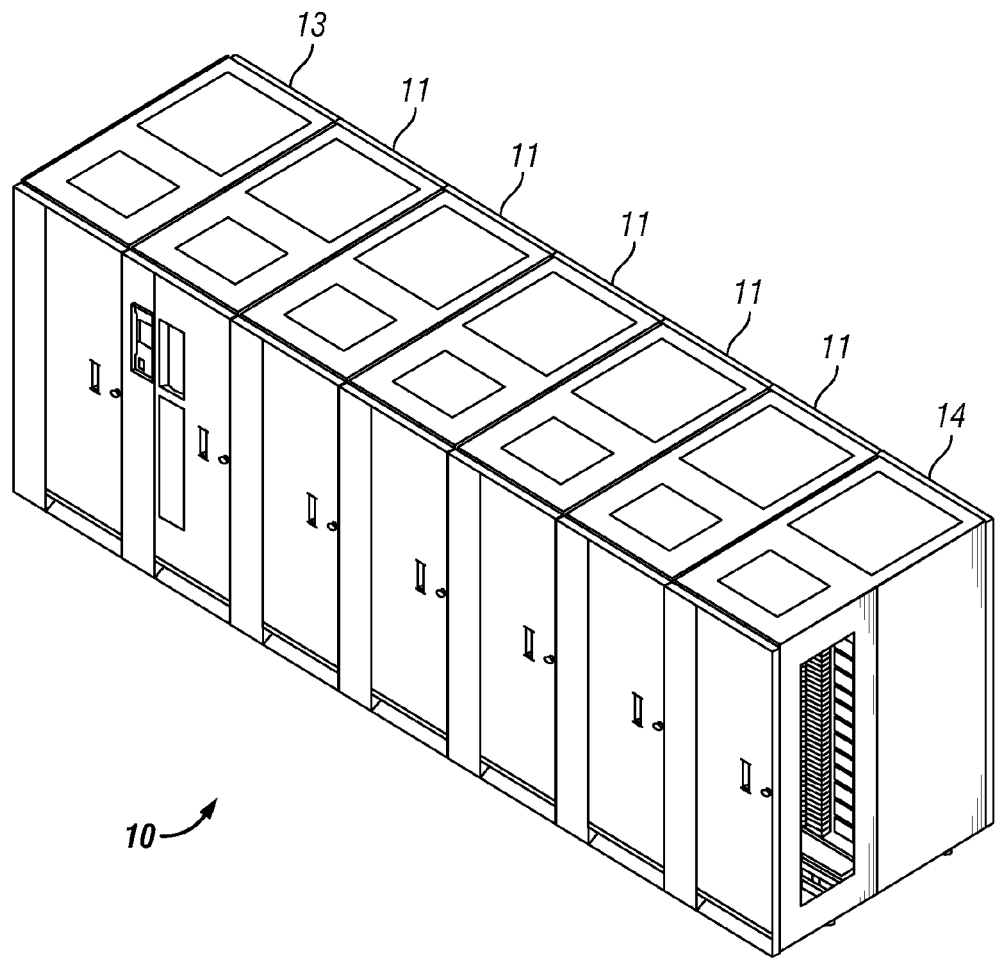
FIG. 1 illustrates automated data storage library with the view specifically depicting a library having a left hand service bay, multiple storage frames and a right hand service bay in accordance with an embodiment of the invention.

Automated data storage libraries include one or more accessors to move data storage cartridges between storage cells and to data storage drives. The storage cells must retain the data storage cartridges such that outside influences such as normal machine or door opening or closing operations etc. do not cause the data storage cartridges to move out of the storage cells. However, the retention force of the storage cell must still be easily overcome by an accessor removing or adding cartridges to the storage cell. Retention tabs in a storage cell may be used to engage with a notch in a data storage cartridge to retain the data storage cartridge in the slot. The notch of the data storage cartridge, and the data storage cartridge itself, have generally smooth surfaces. Similarly, the retention tab of the storage cell, and the storage cell itself, have generally smooth surfaces. The smooth surface of the notch of the data storage cartridge comes into contact with the smooth surface of the retention tab of the storage cell and the data storage cartridge is retained in the storage cell by a certain amount of friction. However, in some cases, the amount of friction between the retention tab and notch is too high such that the accessor is not able to remove the data storage cartridge from the storage cell. Further, the amount of friction between the retention tab and notch is not consistent for each data storage cartridge and its respective storage cell, such that accessor may be able to remove some data storage cartridges from their respective storage cells, but not be able to remove others. These issues may result in the accessor being unable to remove one or more data storage cartridges from their respective storage cells causing undesired downtime for the automated data storage library.

Described are embodiments of an invention for a method and a tool to produce a textured surface on the retention tab of a storage cell. The tool has a form that fits within the storage cell. The form has a hard material with a hard surface which contacts a surface of the retention tab within the storage cell. The movement of the hard surface across the surface of the retention tab produces a textured surface on the retention tab. In one embodiment, the removal of the texturing tool from the storage cell causes the hard surface of the texturing tool that is in contact with the at least one surface of the retention tab to scrape the surface of the retention tab producing a textured surface of the retention tab.

The storage cell includes a housing for storing a data storage cartridge and includes an opening for inserting and removing a data storage cartridge. A retention tab within the housing engages with the notch of the data storage cartridge to retain the data storage cartridge with the housing. In one embodiment, the tool produces texture on the retention tab of a storage cell. The textured surface of the retention tab reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell.

Further, the textured surface allows for a more consistent amount of friction between the notch and retention tab for each data storage cartridge and its respective storage cell. This consistent amount of friction between the notch and retention tab allows for the amount force required to move one data storage cartridge from its respective storage cell to be close to the amount of force required to move another data storage cartridge from its respective storage cell. Thus, a consistent amount of force can be applied by the accessor to remove each data storage cartridge from their respective storage cells. Thus, the textured interface between the notch of the data storage cartridge and the retention tab allows for a low and consistent force to remove a plurality of data storage cartridges from their respective storage cells.

It will be obvious, however, to one skilled in the art, that embodiments of the present invention may be practiced without some or all of these specific details. In other instances, well known process operations have not been described in detail to prevent obscuring the embodiments of the present invention described herein.

It is understood that all surfaces have a certain amount of texture. Therefore, for purposes of the description herein, a textured surface is a surface that has more texture than an immediate surrounding area. For example, in the embodiment in which the tool produces a textured surface on the retention tab, the retention tab is said to have a textured surface when the textured surface has more texture than that of the immediate surrounding area (e.g. the sidewall of the storage cell if the retention tab is provided on a sidewall of the storage cell) Accordingly, a non-textured surface or a smooth surface is defined herein as a surface that has the same amount of texture or less texture than an immediate surrounding area.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention. The invention will be described as embodied in an automated data storage library for use in a data processing environment. Although the invention shown used magnetic tape cartridges, one skilled in the art would recognize that the invention equally applies to optical disk cartridges or other removable storage media.

Figure 2:
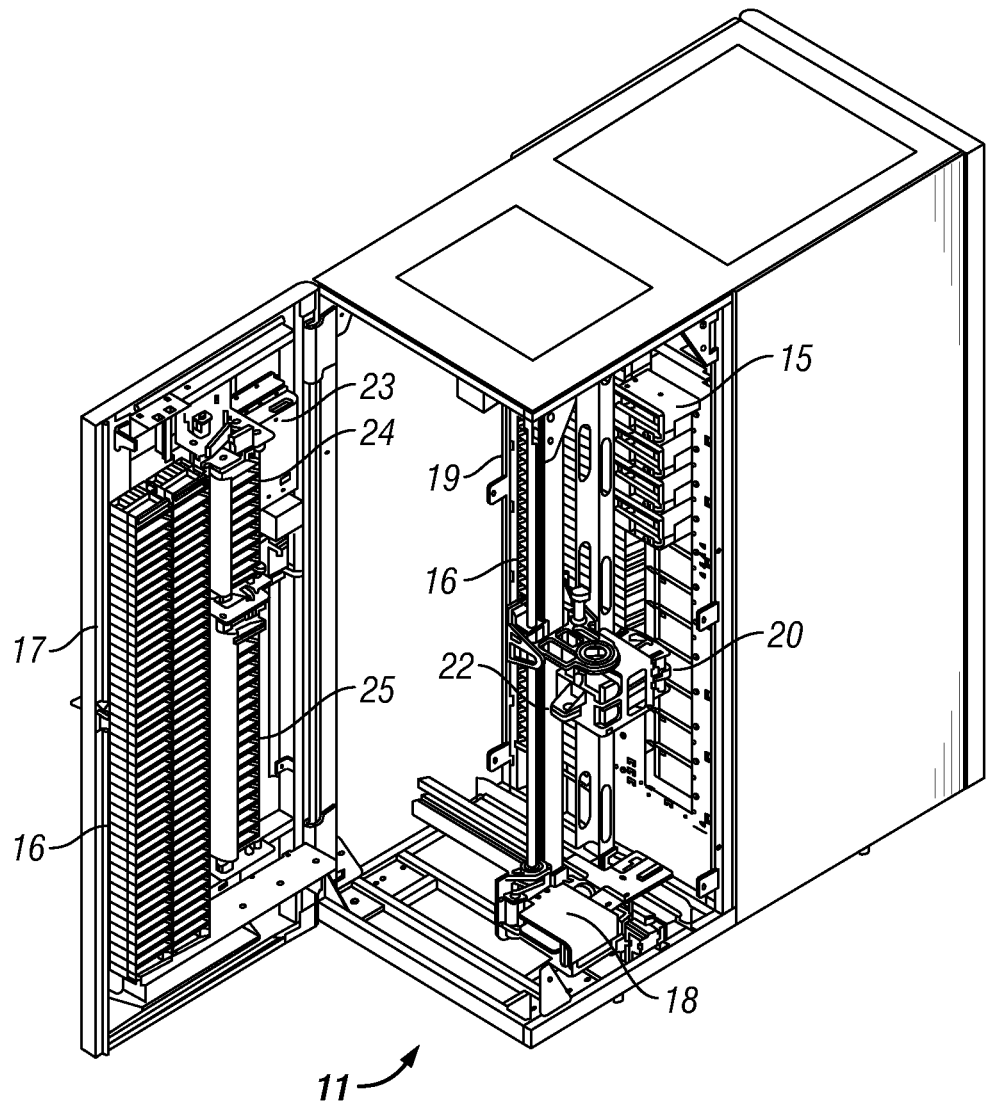
FIG. 2 illustrates an automated data storage library with the view specifically depicting an exemplary basic configuration of the internal components of a library in accordance with an embodiment of the invention.

Turning now to the Figures, FIGS. 1 and 2 illustrate an automated data storage library 10 which stores and retrieves data storage cartridges containing data storage media (not shown) in storage cells 16. It is noted that references to "data storage media" herein refer to data storage cartridges, and for purposes herein the two terms may be used synonymously. An example of an automated data storage library which may be used in the described embodiments is the IBM® 3584 UltraScalable Tape Library, and has a configuration as depicted in FIGS. 1 and 2. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16, on front wall 17 and rear wall 19 for storing data storage cartridges that contain data storage media; at least one data storage drive 15 for reading and/or writing data with respect to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
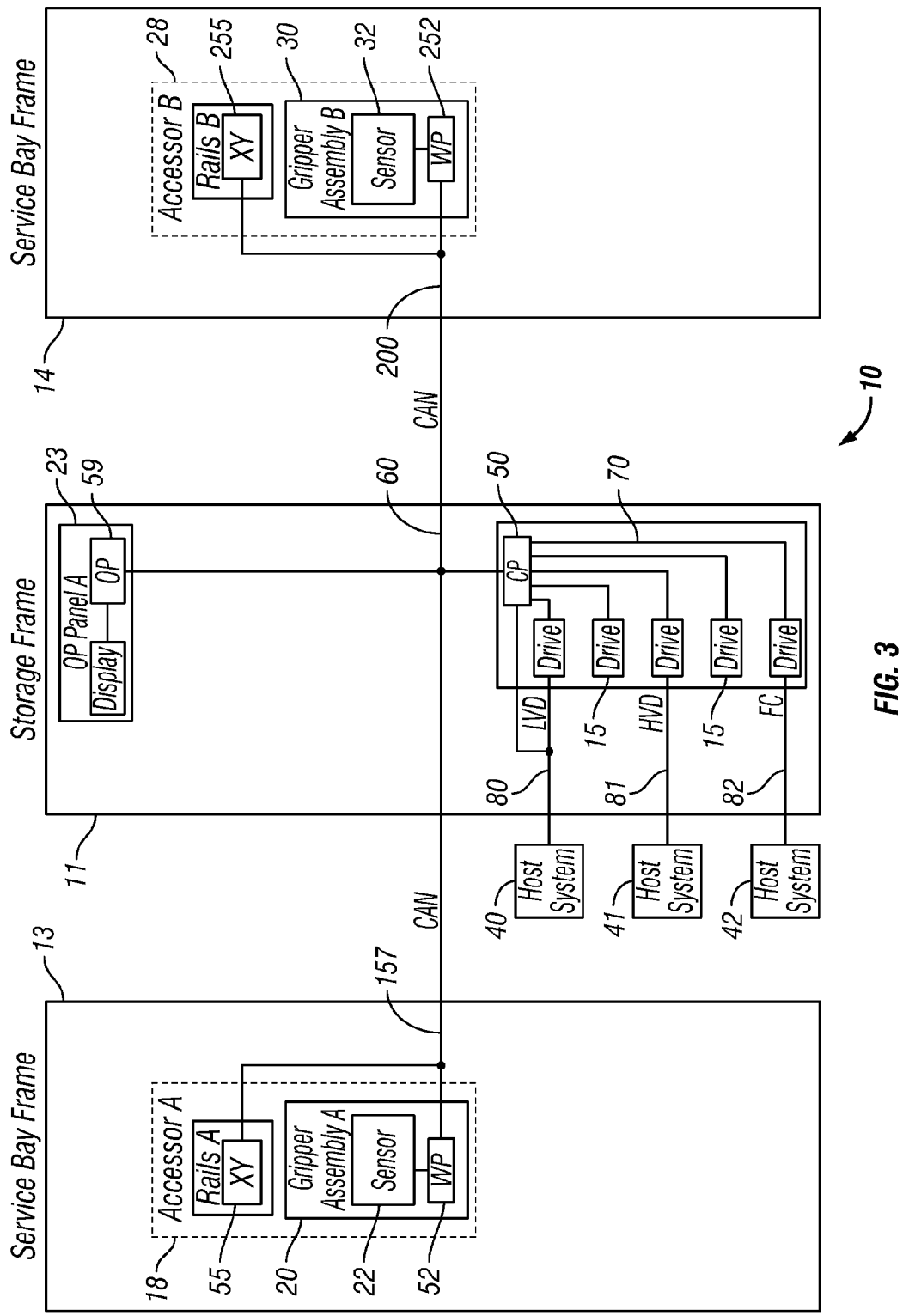
FIG. 3 is a block diagram of an automated data storage library with the diagram specifically depicting a library that employs a distributed system of modules with a plurality of processor nodes in accordance with an embodiment of the invention.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which may implement the described embodiments, is the IBM 3584 UltraScalable Tape Library.

While the automated data storage library 10 has been described as employing a distributed control system, the described embodiments may be implemented in automated data storage libraries regardless of control configuration, such as, but not limited to, an automated data storage library having one or more library controllers that are not distributed. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage cells 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes 52, 252 are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. One or more XY processor nodes 55, 255 are provided, which may comprise, e.g., an XY processor node 55 located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the library/drive interface. As is known to those of skill in the art, various communication arrangements may be employed for communication with the hosts and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, RS-422, USB (Universal Serial Bus), SAS (Serial Attached SCSI), etc. The data storage drives 15 are thus individually coupled to the communication processor node 50 by means of lines 70. Alternatively, the data storage drives 15 may be coupled to the communication processor node 50 through one or more networks, such as CAN, Ethernet, etc.

Additional storage frames 11 may be provided and each is coupled to the adjacent storage frame. Any of the storage frames 11 may comprise communication processor nodes 50, storage cells 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
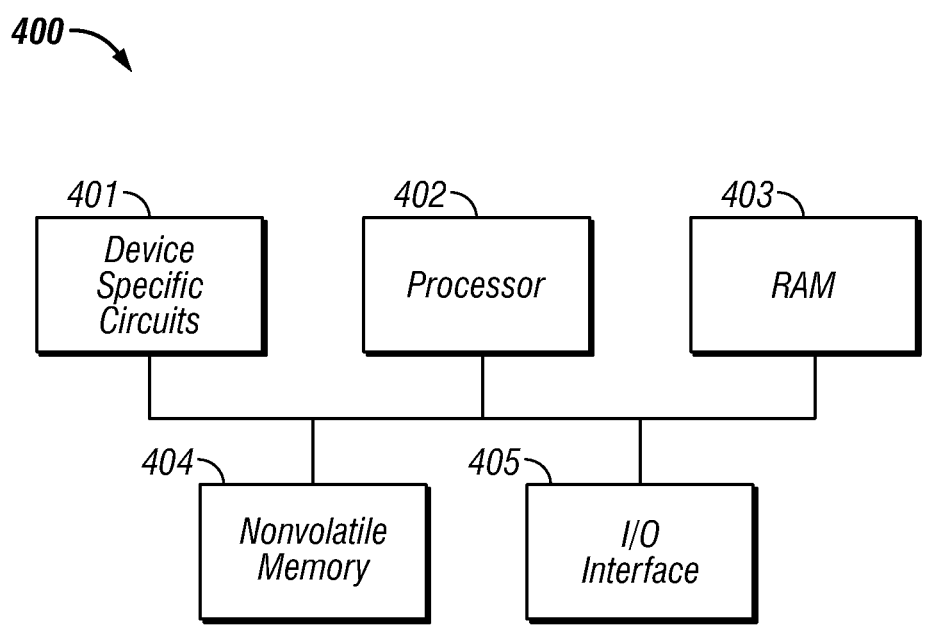
FIG. 4 is a block diagram depicting an exemplary controller configuration in accordance with an embodiment of the invention.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, ROM (Read Only Memory), PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CompactFlash®, SD (Secure Digital), CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller 400. Examples may comprise, but are not limited to, serial interfaces such as RS-232, USB (Universal Serial Bus), SCSI (Small Computer Systems Interface), Fibre Channel, Ethernet, SAS (Serial Attached SCSI), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the described embodiments may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
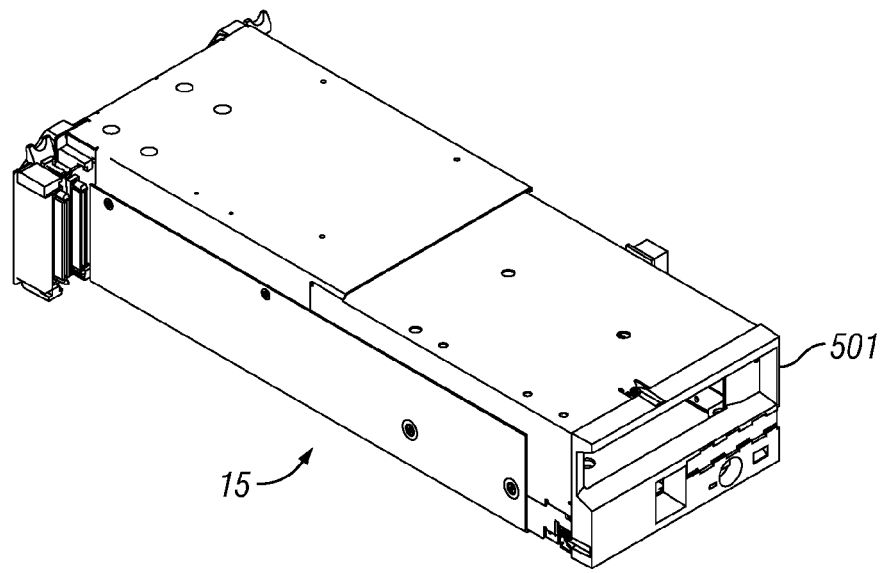
FIG. 5 illustrates a front and rear view of a data storage drive in accordance with an embodiment of the invention.
Figure 5:
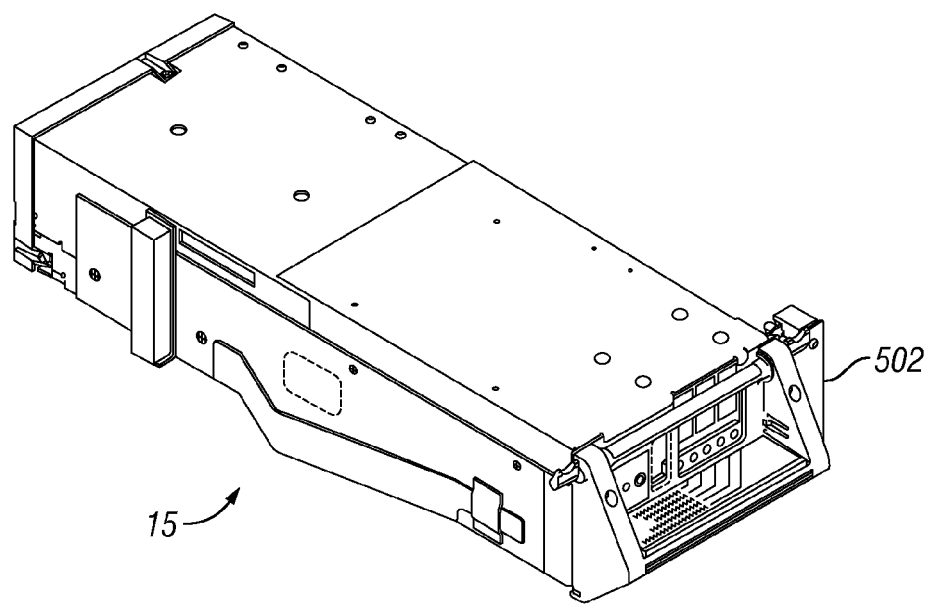

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
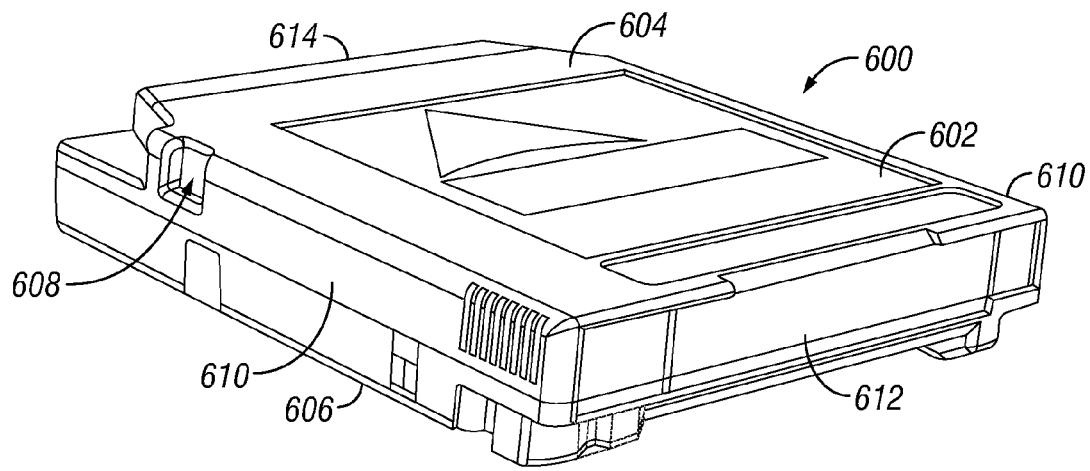
FIG. 6 illustrates a data storage cartridge in accordance with an embodiment of the invention.

FIG. 6 illustrates an embodiment of a data storage cartridge 600. Data storage cartridge 600 comprises data storage media (not shown). In one embodiment, the data storage media may be magnetic tape and, accordingly, data storage cartridge 600 may be a tape cartridge. The data storage cartridge 600 is inserted in data storage drive 15 so that the data may be read and/or written to the data storage media. As shown in FIG. 6, the data storage cartridge 600 comprises a generally rectangular housing 602 forming an exterior dimensional form factor of the data storage cartridge 600. The cartridge housing 602 has a top 604, a bottom 606, two sides 610, a front 612, and a back 614. A notch 608 is provided on the data storage cartridge 600 for engaging with a retention tab of a storage cell 16 of an automated data storage library 10. As shown, in one embodiment the notch 608 is on a one side 610 of the data storage cartridge 600. However, one of ordinary skill in the art would understand that the notch 608 could be provided at any location on the data storage cartridge 600. For example, the notch 608 could be provided either side 610 of the data storage cartridge, the top 605 or bottom 607, or the front 612 or back 614 of the data storage cartridge 600, or at a plurality of locations described above.

Figure 7:
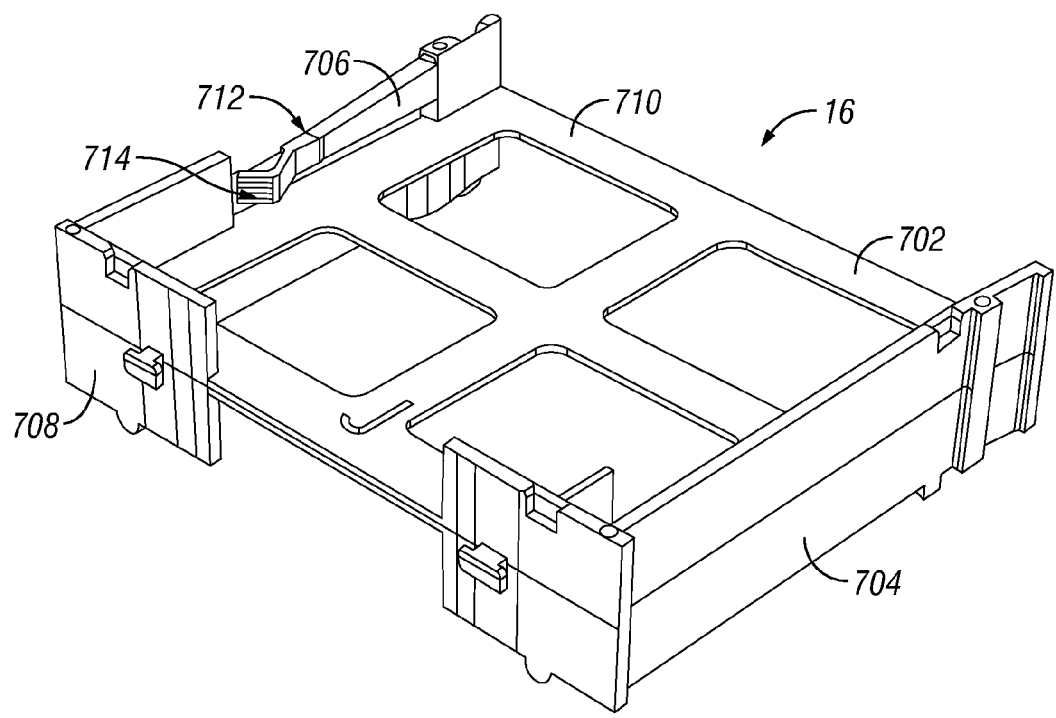
FIG. 7 illustrates a storage cell in accordance with an embodiment of the invention.
Figure 10:
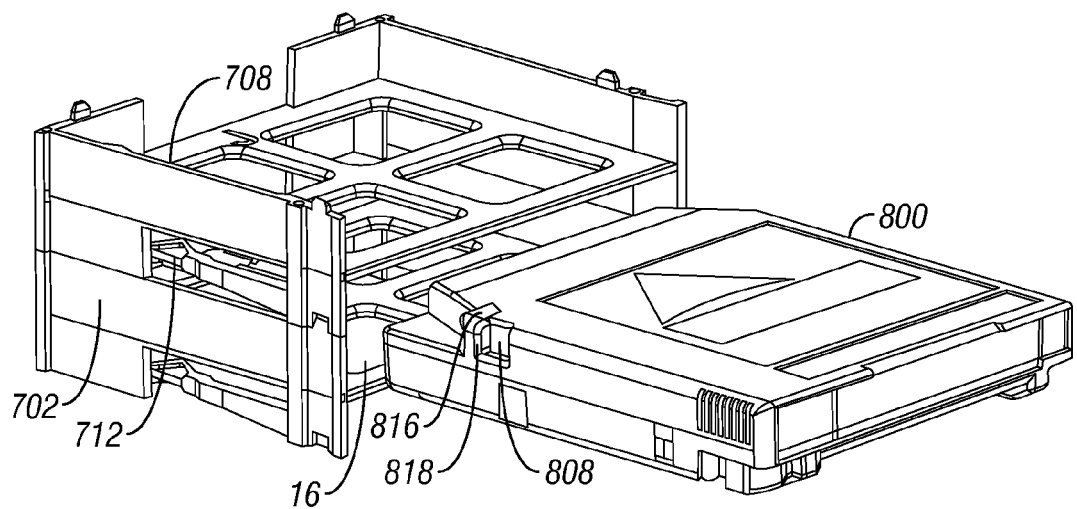
FIG. 10 illustrates the insertion and removal of a texturing tool from a storage cell and in accordance with and embodiment of the invention.

FIG. 7 illustrates an embodiment of a storage cell 16 comprising storage cell housing 702. The housing 702 includes a pair of opposing side walls 704, 706, a back wall 708, and a floor 710 which is orthogonal and connected to the two opposing side walls 704, 706 and the back wall 710. The side walls 704, 706, back wall 708, and floor 710 define an opening for inserting and removing data storage cartridge 600. As shown in FIG. 10, the housing 702 is modular in nature and can be stacked over another housing to form a larger array of a plurality of storage cells 16. For example, FIG. 2 illustrates a plurality of storage cells 16 on front wall 17 and rear wall 19 of an automated data storage library 10. Returning to FIG. 7, the housing 702 conforms substantially to the shape and size of a data storage cartridge 600 with tolerances that allow the easy and convenient insertion of the data storage cartridge through the storage cell 16 opening.

The housing 702 includes a retention tab 712 for engaging the notch 608 of data storage cartridge 600 when the data storage cartridge 600 is inserted into the storage cell 16. The retention tab 712 protrudes from a side wall 706 of the housing 702 and depresses out of the path of the data storage cartridge 600 when the data storage cartridge 600 is inserted within the housing 712 and engages with the notch 608 of the data storage cartridge 600. The retention tab 712, when engaged with the notch 608 of data storage cartridge 600, retains the data storage cartridge 600 within the storage cell 16 and prevents the data storage cartridge 600 from falling out from the storage cell 16 due to outside influences such as machine vibration or opening or closing of a door to the automated storage library.

Figure 8:
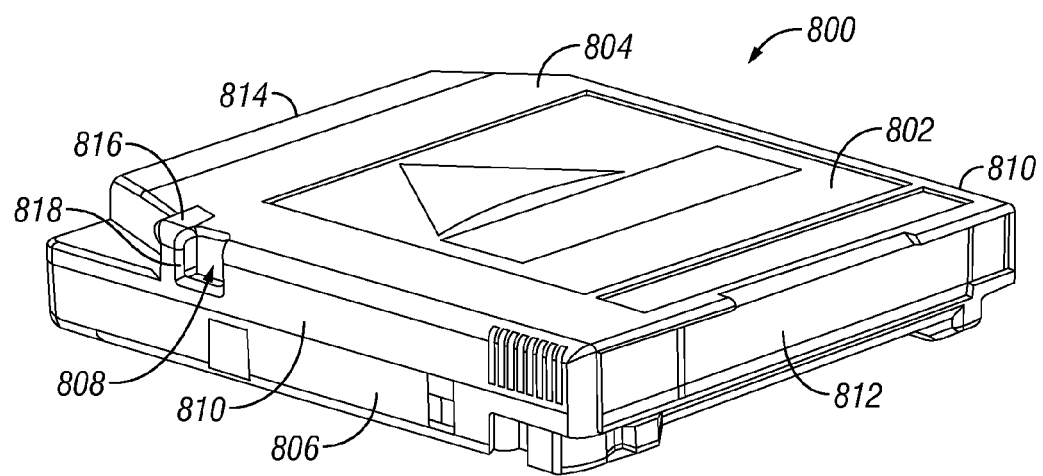
FIG. 8 illustrates a texturing tool in accordance with an embodiment of the invention.

FIG. 8 illustrates an embodiment of tool for texturing 800. In one embodiment, the texturing tool 800 is used to texture a retention tab 712 of a data storage cell 16 of an automated data storage library 10. In one embodiment the tool for texturing 800 comprises a generally rectangular form 802 forming an exterior dimensional form factor of the tool for texturing 800. Furthermore, in one embodiment, the tool for texturing 800 has the form factor of a data storage cartridge 600 stored with the data storage cell 16 of automated data storage library 10. The form 802 has a top 804, a bottom 806, two sides 810, a front 812, and a back 814. A notch 808 is provided on the texturing tool 800 for engaging with a retention tab of a storage cell 16 of an automated data storage library 10. As shown, in one embodiment the notch 808 is on a one side 810 of form 800. However, one of ordinary skill in the art would understand that the notch 808 could be provided at any location on the texturing tool 800. For example, the notch 808 could be provided either side 810 of the texturing tool, the top 805 or bottom 807, or the front 812 or back 814 of the texturing tool 800, or at a plurality of locations described above.

The texturing tool 800 has a form 802 that has fits within a storage cell 16 of an automated data storage library 10. In one embodiment, the form 802 has an interference fit within the storage cell 16 of the automated data storage library 10. The term interference fit is defined herein as two parts being held together by friction. In one embodiment, the form 802 has a form factor of a data storage cartridge that is customarily stored within the storage cell. For example, the texturing tool 800 when inserted into the storage cell 16 the retention tab 712 depresses out of the path of the texturing tool 800 and engages with the notch 808 of the texturing tool 800. The friction between the notch 808 of the texturing tool 800 and the retention tab 712 retains the texturing tool 800 with the storage cell 16 without an external force applied (e.g. an accessor pulling on the texturing tool 800). In one embodiment, the texturing tool 800 conforms substantially to the shape and size of a storage cell 16 with tolerances that allow the easy and convenient insertion of the texturing tool 800 through the storage cell 16 opening.

The form 802 of the texturing tool 800 includes a hard material 816 which includes at least one hard surface 818. A hard material 816 is defined herein as a material, or a material that includes another material, that is harder that the material that it comes into contact with during the use of the texturing tool 800. For example, the hard material 816 of the texturing tool 800 is a material, or includes a material, that is harder than the material of the retention tab 712. In one embodiment, the hard material 816 has a higher hardness than a hardness of the material of the surface of the retention tab. In one embodiment, the hard surface 818 of the hard material 816 may be textured or roughened, or may include an abrasive material. Still further, in one embodiment, the hard material 816 may include one of, or a combination including one or more of steel, an abrasive filler, or an abrasive oxide. The hard material 816 may be affixed to the form 802 of the texturing tool 800 by any means, including, but not limited to molding, welding, ultrasonic welding, over molding, compression, adhesive, or by a fastener.

The at least one hard surface 818 of the texturing tool 800 contacts at least one surface of the retention tab 712 within the storage cell 16 when the form 802 of texturing tool 800 is inserted with the storage cell 16. The movement of the hard surface 818 of the form 802 across the at least one surface of the retention tab 712 produces a textured surface 714 on the surface of the retention tab 712. In one embodiment, the movement of the hard surface 818 of the form 802 across the at least one surface of the retention tab 712 scrapes the surface of the retention tab 712 producing a textured surface 816. In one embodiment, the hard surface 818 of the hard material 816 is adjacent the notch 808 of the form 802.

Figure 9:
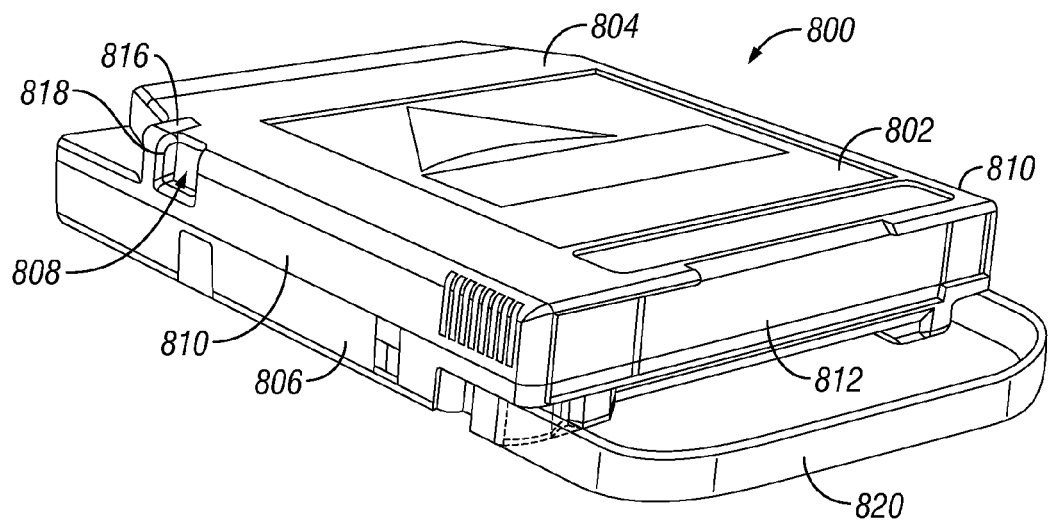
FIG. 9 illustrates a texturing tool having a handle in accordance with an embodiment of the invention.

FIG. 9 illustrates an embodiment of a texturing tool 800 having a handle 820. In one embodiment, the texturing tool 800 is used to texture a retention tab 712 of a data storage cell 16 of an automated data storage library 10. In one embodiment, the texturing tool 800 comprises a generally rectangular form 802 forming an exterior dimensional form factor of the tool for texturing 800. Furthermore, in one embodiment, the tool for texturing 800 has the form factor of a data storage cartridge 600 stored with the data storage cell 16 of automated data storage library 10. The form 802 has a top 804, a bottom 806, two sides 810, a front 812, and a back 814. A notch 808 is provided on the texturing tool 800 for engaging with a retention tab of a storage cell 16 of an automated data storage library 10. As shown, in one embodiment the notch 808 is on a one side 810 of form 800. However, one of ordinary skill in the art would understand that the notch 808 could be provided at any location on the texturing tool 800 so long as the notch 808 aligns with retention tab 712 of the storage cell 16. In this embodiment the texturing tool 800 includes a handle 820. The handle 820 of texturing tool 800 is affixed to the front side of texturing tool 800. Handle 820 may be affixed to the form 802 of the texturing tool 800 by any means, including, but not limited to molding, welding, ultrasonic welding, over molding, compression, adhesive, or by a fastener.

FIG. 10 illustrates an embodiment of texturing tool 800 being inserted and removed from the storage cell 16 of an automated data storage library 10 to produce a textured surface 714 on the retention tab 712 of the storage cell 16. In one embodiment, the texturing tool 800 is inserted and removed from the storage cell 16 by accessor 18 with a gripper assembly 20. The accessor 18 inserts texturing tool 800 with the back 814 of the form 802 facing the back wall 708 of the storage cell housing 702. As shown in FIG. 10, the notch 808 of the texturing tool 800 aligns with the retention tab 712. As the accessor 18 inserts the texturing tool 800 in the storage cell 16 the retention tab 712 depresses out of the path of the texturing tool 800 and engages with the notch 808 texturing tool 800. When the texturing tool 800 is inserted within the storage cell, at least one hard surface 818 of the hard material 816 adjacent the notch 808 comes into contact with at least one surface the retention tab 712 of the storage cell 16. The accessor 18 removes the texturing tool 800 from the storage cell 16 and produces a textured surface 714 on the retention tab 712. In one embodiment, the removal of the texturing tool 800 from the storage cell 16 causes the hard surface 818 of the form 802 that is in contact with the at least one surface of the retention tab 712 to scrape the surface of the retention tab 712 causing a textured surface 714. In one embodiment, the hard surface 818 that comes into contact with the retention tab 712 is a back corner edge of the notch 808 as shown in FIG. 10. The insertion and removal of the texturing tool 800 by the accessor 18 allows for an automation of the texturing of the retention tabs 712 of the storage cells 16. In one embodiment, the texturing tool 800 is inserted and removed from the storage cell 16 by a human using handle 820.

Figure 11:
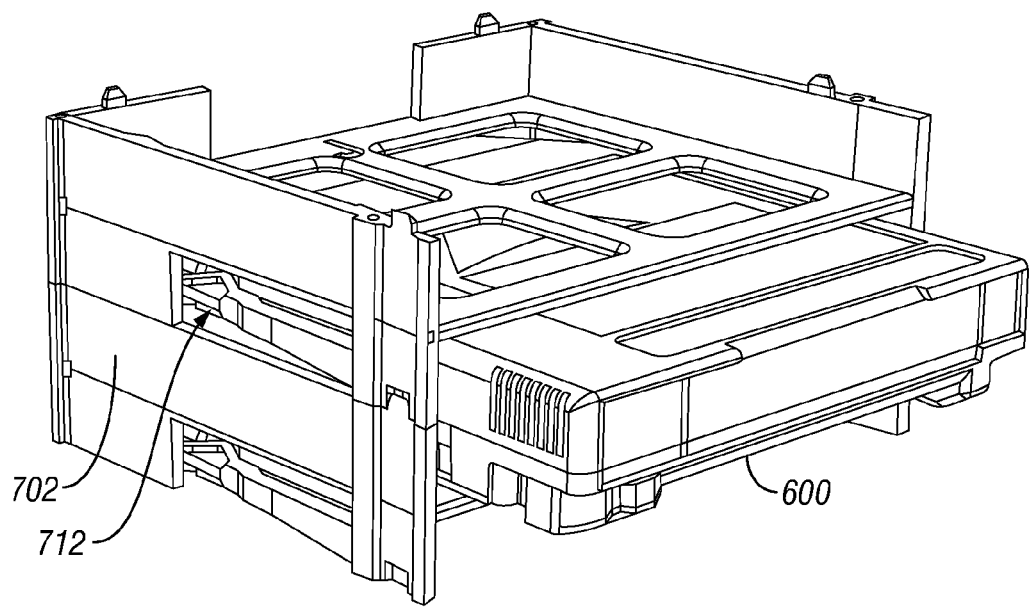
FIG. 11 illustrates a data storage cartridge inserted in a storage cell in accordance with and embodiment of the invention Features, elements, and aspects of the invention that are referenced by the same numerals in different figures represent the same, equivalent, or similar features, elements, or aspects, in accordance with one or more embodiments.

FIG. 7 illustrates the textured surface 714 of retention tab 712 produced by the insertion and removal of the texturing tool 800 within the storage cell 16. FIG. 11 illustrates data storage cartridge 600 stored within the storage cell 16 having a textured retention tab 712. The retention tab 712 is engaged with the notch 608 of the data storage cartridge 600. The textured surface 714 of retention tab 712 contacts the notch 608 of the data storage cartridge 600. The texture on textured surface 714 of retention tab 712 reduces the contact surface between the retention tab 712 and the notch 608 of the data storage cartridge 600. Accordingly the reduced contact surface between the retention tab 712 and the notch 608 of the data storage cartridge 600 reduces the amount of friction between the retention tab 712 and the notch 608 of the data storage cartridge 600 such that the data storage cartridge 600 can be removed from the storage cell 16 with less force than compared to a retention tab 712 with a non-textured surface. For example, tests have shown that providing a textured area 714 on retention tab 712 reduces the force required to pull data storage cartridge 600 from the storage cell 16 by thirty to fifty percent. Further, the textured surface 714 of the retention tab 712 allows for a more consistent force to be applied in order remove each of the data storage cartridges from their respective storage cells 16.

While FIG. 7 shows that the retention tab 712 is on a side wall 706 of the housing 702, it should be understood that the retention tab 712 could be on either side wall 704, 706 or floor 710 that corresponds with the notch 608 of the data storage cartridge 600 when inserted into the storage cell 16. Still further, while FIG. 7 shows that only area 714 of retention tab 712 includes texture, one of ordinary skill in the art would understand that other surfaces that contact the notch 808 of texturing tool 800 may be textured.

As described, embodiments of the invention include a method and a tool for texturing a retention tab of a storage cell to allow for a textured interface between a notch of a data storage cartridge and a retention tab of a storage cell. The textured interface between the retention tab and the notch of the storage cell provides a consistent and low friction force that retains the data storage cartridge within the cell but allows the accessor to easily remove the data storage cartridge when needed. The textured surface of the retention tab reduces the contact surface between the retention tab and the notch of the data storage cartridge. Accordingly, the reduced contact surface between the retention tab and notch reduces the amount of friction between the retention tab and the notch. The data storage cartridge can thus be removed from the storage cell with less force than that required by the prior art having a generally smooth interface between the notch of the data storage cartridge and the retention tab of the storage cell. Further, the textured surface allows for a more consistent amount of friction between the notch and retention tab for each data storage cartridge and its respective storage cell such that a consistent amount of force can be applied by the accessor to remove each data storage cartridge from their respective storage cells.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A tool for texturing comprising:
   a form that fits in a storage cell,
   said form having a notch configured to receive a retention tab therein when said form is inserted in said storage cell;
   said form having a hard material having a least one hard surface which contacts a surface of said retention tab within said storage cell as said form is inserted in said storage cell; and wherein
   a movement of said hard surface across said surface of said retention tab producing a textured surface on said surface of said retention tab.

2. The tool of claim 1, wherein said hard material is comprised of a material that is harder than a material of said surface of said retention tab.

3. The tool of claim 1, wherein said hard material comprises one of steel, an abrasive filler, an abrasive oxide or any combination thereof.

4. The tool of claim 1, wherein said hard material is affixed to said form by at least one of molding, welding, ultrasonic welding, and over molding.

5. The tool of claim 1, wherein an outer periphery of said form has a form factor of a data storage cartridge stored in said storage cell.

6. The tool of claim 1, wherein said form includes a top that extends from a front of the form to a back of the form, a bottom that extends from the front of the form to the back of the form, and two sides that extend between the top and bottom from the front of the form to the back of the form, wherein a width of the top and bottom as measured between the two sides is greater than a width of the two sides as measured between the top and bottom, and wherein at least one side of said form includes said hard surface.

7. The tool of claim 6, wherein at least one side of said form includes said notch.

8. The tool of claim 1, further comprising a handle.

9. A method of texturing a storage cell comprising:
inserting a texturing tool into a storage cell, thereby depressing a retention tab in the storage cell out of a path of the texturing tool,
wherein said texturing tool has a hard material having a least one hard surface;
contacting a surface of said retention tab of said storage cell with said at least one hard surface of said texturing tool; and
removing said texturing tool from said storage cell, wherein said removal causing said at least one hard surface in contact with said retention tab to produce a textured surface on said surface of said retention tab.

10. A method of texturing a storage cell comprising:
inserting a texturing tool into a storage cell,
wherein said texturing tool has a hard material having a least one hard surface;
contacting a surface of a retention tab of said storage cell with said at least one hard surface of said texturing tool; and
removing said texturing tool from said storage cell, wherein said removal causing said at least one hard surface in contact with said retention tab to produce a textured surface on said surface of retention tab,
wherein said step of inserting said texturing tool is performed by a library accessor.

11. The method of claim 9, wherein said step of inserting said texturing tool is performed by a human.

12. The method of claim 9, wherein said hard material of inserted texturing tool is comprised of a material that is harder than a material of said surface of said retention tab.

13. The method of claim 9, wherein an outer periphery of said texturing tool has a form factor of a data storage cartridge stored in said storage cell.

14. The method of claim 9, wherein said texturing tool includes a top that extends from a front of the tool to a back of the tool, a bottom that extends from the front of the tool to the back of the tool, and two sides that extend between the top and bottom from the front of the tool to the back of the tool, wherein a width of the top and bottom as measured between the two sides is greater than a width of the two sides as measured between the top and bottom, and wherein at least one side of said tool includes said hard surface.

15. The method of claim 9, wherein said tool includes a notch and said hard surface is adjacent said notch; and wherein the retention tab enters the notch when the texturing tool is inserted into the storage cell for retaining the tool in the storage cell.

16. The method of claim 9, wherein said texturing tool further comprises a handle.

17. The method of claim 9, wherein said storage cell is a data storage cartridge storage cell and wherein producing texture on said retention tab decreases the force necessary for removing a data storage cartridge from said data storage cell.

18. The tool of claim 1, wherein the form has a form factor of a tape cartridge.

19. The method of claim 9, wherein the tool has a form factor of a tape cartridge.

* * * * *